United States Patent
Fang et al.

(10) Patent No.: US 11,332,388 B2
(45) Date of Patent: May 17, 2022

(54) REMOVAL OF SELENIUM FROM WATER WITH KAOLINITE

(71) Applicant: FUEL TECH, INC., Warrenville, IL (US)

(72) Inventors: Mingming Fang, Naperville, IL (US); Heng Wang, Hoffman Estates, IL (US)

(73) Assignee: Fuel Tech, Inc., Warrenville, IL (US)

( * ) Notice: Subject to any disclaimer, the term of this patent is extended or adjusted under 35 U.S.C. 154(b) by 53 days.

(21) Appl. No.: 16/999,687

(22) Filed: Aug. 21, 2020

(65) Prior Publication Data
US 2021/0053845 A1 Feb. 25, 2021

Related U.S. Application Data

(60) Provisional application No. 62/890,111, filed on Aug. 22, 2019.

(51) Int. Cl.
*C02F 1/28* (2006.01)
*B01J 20/12* (2006.01)
*C02F 101/10* (2006.01)

(52) U.S. Cl.
CPC .............. *C02F 1/281* (2013.01); *B01J 20/12* (2013.01); *C02F 2101/106* (2013.01)

(58) Field of Classification Search
None
See application file for complete search history.

(56) References Cited

U.S. PATENT DOCUMENTS

| | | | | |
|---|---|---|---|---|
| 5,906,750 A | * | 5/1999 | Haase | C02F 11/148 210/727 |
| 2014/0076810 A1 | * | 3/2014 | Jessop | C08F 8/32 210/638 |
| 2019/0092878 A1 | * | 3/2019 | Picken | C08B 37/0084 |

OTHER PUBLICATIONS

Bar-Yosef, Selenium sorption by kaolinite and montmorillonite, Soil Science Jul. 1987 vol. 111 Issue 1 p. 11-19 (Abstract only) (Year : 1987).*

* cited by examiner

*Primary Examiner* — Chester T Barry
(74) *Attorney, Agent, or Firm* — OspreyIP, pllc; James R. Cartiglia

(57) ABSTRACT

The description relates to a composition and a method for reducing the concentration of selenium in water. Contaminated water is contacted with a kaolinite clay characterized by a removal efficiency for selenatearsenate of at least 40 wt % at ambient temperature. The adsorption process is fast. Following sufficient contact, the water is separated from the kaolinite clay. In a preferred form, the kaolinite clay has high surface acidity.

8 Claims, 4 Drawing Sheets

REMOVAL OF SELENIUM FROM WATER WITH KAOLINITE

FIELD OF THE INVENTION

The invention relates to the discovery that kaolinite has a high efficiency for removal of inorganic selenium, particularly selenate, from water.

BACKGROUND OF THE INVENTION

A healthy population requires safe drinking water at a reasonable cost. This often requires purification to eliminate harmful levels of some common materials, like selenium.

Selenium (Se) is a nutrient found in most soils and natural water sources, originating in rock, coal, limestone and other natural formations and redistributing through both natural and industrial activity. Se is also toxic in higher concentrations and a subject of Effluent Limitation Guidelines and other water regulations.

Although selenium is an essential micronutrient for mammals, consumption of quantities exceeding daily recommendations can cause health issues. The U.S Environmental Protection Agency's maximum allowable contaminant level for selenium in drinking water is currently 50 µg/L (0.05 ppm or 50 ppb), but regulatory limits for wastewater from the steam electric power industry have been recently lowered. For example, the maximum point source discharge limits for total selenium in wastewater from FGD is only 12 µg/L (0.012 ppm or 12 ppb) for any one day.

The WHO recognizes that selenium is an essential element, and notes that various national and international organizations have established recommended daily intakes of selenium. The joint World Health Organization (WHO)/Food and Agriculture Organization of the United Nations (FAO) consultation on preparation and use of food-based dietary guidelines (FAO/WHO, 1998) listed recommended intakes of 6-21 µg of selenium per day for infants and children, according to age, 26 and 30 µg of selenium per day for adolescent females and males, respectively, and 26 and 35 µg of selenium per day for adult females and males, respectively. The WHO notes that, because of concern about the adverse effects resulting from exposure to excessive levels of selenium, various national and international organizations have established upper limits of exposure for selenium.

In 2000, the United States National Academy of Sciences Panel on Dietary Oxidants and Related Compounds revised the recommended intake of selenium to 55 µg/day for both men and women and 70 µg/day for women during pregnancy and lactation. Recommended selenium intakes for children are between 15 µg/day for infants 0-6 months of age and 30 µg/day for children 4-8 years old (NAS, 2000).

The United Kingdom Expert Group on Vitamins and Minerals recommends selenium intakes of 60 µg/day for women and 70 µg/day for men (UK EGVM, 2002).

it is apparent that the problems posed by selenium are more complex than simple recommendations might suggest; because some groups, such as New Zealanders and Swedish vegans, have very low intakes, comparable to those in selenium-deficient parts of China, with no apparent adverse effects. Therefore, other aspects of the diet would appear to be important in mitigating the effects of low selenium intakes (FAO/WHO, 1998). The United States National Academy of Sciences Panel on Dietary Oxidants and Related Compounds set an upper tolerable limit for selenium at 400 µg/day (NAS, 2000). This level was also recommended by FAO/WHO (1998) and the United Kingdom Expert Group on Vitamins and Minerals (EGVM, 2002).

Selenium has similar chemistry to sulfur. For example, similar to $SO_2$, most elemental selenium in coal combustion is oxidized to $SeO_2$. $SeO_2$, like $SO_2$, has a natural affinity to basic adsorbents like Trona, calcium hydroxide and so forth. However, due to the solubility of some selenium forms, while direct sorbent injection (DSI), electrostatic precipitation (ESP) and wet flue gas desulfurization (WFGD) as a combined treatment train in coal combustion can remove greater than 95% of total sulfur, performance with selenium is less (60 to 90% removal).

Selenium and arsenic also often occur together in conversations about wastewater treatment, but their chemical behavior is different. In particular, while selenite is the preferred form of selenium for wastewater treatment, arsenate is the preferred form for arsenic. Accordingly, preferred treatment strategies relying on chemical oxidation of arsenite to arsenate will also drive selenite to selenate, a problematic outcome.

Natural selenium is mobilized by agricultural irrigation, surface mining, fossil fuel combustion, oil refining, and other activities. In combustion, the common forms in stack emissions are mostly selenium dioxide ($SeO_2$), and maybe a small amount of elemental selenium and selenium hydride ($H_2Se$). Remaining selenium also occurs as selenite ($SeO_3^{2-}$) or selenate ($SeO_4^{2-}$) in wet flue gas desulfurization wastewater. In mining, selenium is found in the waste rock and can also be released in ore processing. Exposed to air, this selenium will be oxidized into selenite or selenate and leach into water. In oil and gas activities, trace amounts of selenium are found in produced and flowback waters. Downstream refining of oil results in selenium in wastewater in the forms of selenium hydride (also called hydrogen selenide), selenocyanate (CNSe—), selenite and selenate.

Generally speaking, selenium in water between pH of 6 and 8 takes the form of elemental selenium and dissolved selenite and selenate salts and ions.

Elemental selenium is a solid and insoluble in water, existing in particulate form. Most metal selenite salts are also insoluble in water, therefore, both elemental selenium and selenite can be filtered out from water and be removed relatively easily. However, common metal selenate salts such as calcium selenate [$CaSeO_4$] are soluble and can't be removed by settling and normal filtration. It is easier to deal with selenites than selenates (i.e., from a treatment perspective, "like selenites, hate selenates").

The technology recommended by the EPA for selenium removal (in its soluble forms as selenite and selenate) is precipitation with ferrihydrite. However, this method is not economical for selenium removal to a level below 50 ppb. Other commonly applied treatments are membrane filtration, microbial treatment, and anion exchange. Membrane filtration is expensive due to low selectivity and fouling problems. Microbial treatment, based on reducing all selenium to elemental selenium, is sensitive to oxygen and nitrate and high carbon concentrations are required. Ion exchange resins show selectivity for selenite and selenate, but sulfate reduces its removal rate and needs to be removed prior to the process.

It is most cost-effective to control the amount of selenium that migrates into wastewater in the first place, such as through waste rock management in mining to minimize oxidation opportunities or minimizing contact with water sources in industrial processing. Once in the wastewater, the dilute levels of selenium make treatment inherently challenging.

Selenium is removed from wastewater principally through either biological or chemical/physical processes and there are many process types and variants. A few are highlighted here. Selenite or selenate can be biologically reduced by bacteria under anoxic conditions to elemental selenium. This process requires a carbon source like methanol or molasses to serve as an electron donor and a several-hour hydraulic residence time (HRT), similar to biological denitrification. In fact, if nitrate is also present in the water, it will typically be preferentially reduced. Biological treatment processes commonly require upstream treatment (to remove solids) and/or downstream treatment (to filter biomass, precipitated selenium, and possibly add dissolved oxygen) to meet discharge limits. One advantage of biological treatment is that both selenate and selenite species are reduced to elemental selenium.

Physical methods have been considered and used for selenium removal. It requires special filtration such as membrane filtration, the small size of selenite and selenate molecules requires reverse osmosis or nanofiltration media without further treatment. In zero liquid discharge designs, evaporation will concentrate selenium with other contaminants. Both of these are quite expensive.

Predominant non-biological methods for selenium removal from wastewater are chemical methods. For example, iron co-precipitation is a process in which relatively large amounts of ferric oxide/hydroxide is used to simultaneously remove low concentrations of other contaminants by capturing them within the ferric compounds. Iron co-precipitation effectively removes selenite but removes very little selenate. This process has been widely used at mine sites, and typically requires clarification and filtration downstream of the co-precipitation process, as it generates large amounts of sludge.

Ion exchange is another technology used to remove selenium. Selenate and selenite ions are exchanged for like-charged ions using specialty resins that are specifically designed for selenium. The resin capacity for selenium can be increased if competing anions such as nitrate and sulfate are not present (either naturally or are removed in pre-treatment). After the resin capacity is reached, the resin requires regeneration. This concentrated regenerant must then be disposed of or further treated.

Chemical reduction and adsorption of selenate and selenite is possible in another relatively new iron-based technology called ZVI (zero valent iron). This media-based system is typically applied in tanks or filter vessels. The iron acts as both a catalyst and electron donor. Selenium species are reduced to elemental selenium or to selenite that then adsorbs to iron species formed on the base media.

In developing the Effluent Limitation Guidelines for the Steam Electric Power Category, the EPA chose "chemical precipitation+biological treatment" and "chemical precipitation+vapor compression evaporation" as the best available technologies (BAT) for existing and new sources of wastewater, respectively. BAT means that the limits are deemed economically achievable based on operating results. Thus, combinations of technologies generally need to be used to achieve stringent selenium control targets.

Selenium species are rarely purposefully oxidized (to avoid the hard-to-remove selenate form), but certain species like selenocyanates must be oxidized into selenite or selenate ahead of biological treatment or prominent chemical/physical reducing treatments. Oxidants like chlorine, hydrogen peroxide, or potassium permanganate can be used.

While direct oxidation is not a viable treatment approach for selenium overall, as noted above many treatment technologies require pre- or post-treatment before discharge of a final water effluent. The outlet stream may need extra dissolved oxygen or treatment to reduce BOD to meet permit levels. ZVI systems also typically need post-treatment like aeration and clarifying/settling to oxidize and remove iron species.

The use of adsorbents to remove selenium is attractive since it is a simple and low-cost process. The current challenge is to find a good solid adsorbent that is inexpensive and can adsorb selenium oxyanions from water fast and efficiently. Selenium oxyanions include selenite $[SeO_3^{2-}]$ and selenate $[SeO_4^{2-}]$ in water. Selenite anion can react with many metal cation in wastewater such as calcium and magnesium cations to form water-insoluble calcium and magnesium selenite, and therefore, precipitates out of water phase. Selenate anions, on the other hand, can't form the similar precipitates easily and is the main challenge for wastewater treatments.

The patent literature has noted the seriousness of the problem of selenium in drinking water, but the art is still in search of an efficient and economical solution to the problem. For example, U.S. Pat. No. 6,080,319 describes a process using organoclay (surfactant-modified clay) to mitigate contaminants in water including selenate. The patent asserts that a method removes contaminants including selenium from water by contacting the contaminants in the water with an organoclay having a positive or negative charge on its surface. Using this method, it is said that organic and inorganic contaminants can be removed with such charged organoclays. However, it is limited to the specific surface-modified clays and does not contemplate those not so treated.

And U.S. Patent Publication No. US2008-0311288A1 uses zero-valent iron and other element coated kaolinite as the adsorbent to remove heavy metal ions from water. Again, the teachings are limited to the specific surface-modified clays and does not contemplate those not so treated.

Similarly, U.S. Pat. No. 9,404,166 describes the use of a specific surfactant with a metal-binding agent coated substrate to remove metal ions including selenium in water. The patent describes a composition comprising a substrate, an organic ion, and a metal binding agent, wherein the substrate comprises a natural clay, a synthetic clay, a natural zeolite, a synthetic zeolite, a polymer resin, lignite, kaolinite, serpentine, illite, chlorite, smectite, montmorillonite, saponite, sepiolite, nontronite, beidellite, heclorite, fuller's earth, attapulgite, bentonite, analcime, chabazite, heulandite, natrolite, phillipsite, stilbite, diethyl aminoethyl, quaternary aminoethyl, or combinations, wherein the organic ion comprises quaternary amines, imidazolium salts, or other salts, wherein the metal-binding agent comprises mercaptan, carboxylic acid, chelating agents, amines, esters, carboxylic acids, alcohols, ethers, aldehydes, ketones, alkenes, among others and combinations. Yet again, it is limited to the specific surface-modified clays and does not contemplate those not so treated.

Also, in a somewhat complex treatment, U.S. Pat. No. 9,725,341 uses hydraulic binders and nucleophilic promoters with solids to remove contaminants from water including selenium. Methods are described comprising: adding one or more hydraulic binders and one or more promoters to the aqueous stream, and separating the contaminants from the aqueous stream. The methods said to be used for removing contaminants that are arsenic-based, selenium-based, cadmium-based, zinc-based, mercury-based, iron-based, chromium-based and/or phosphate-based. Still again, it is limited to the specific surface-modified clays and does not contemplate those not so treated.

The art is in need of effective, economical methods to remove selenium, particularly selenate, from water.

SUMMARY OF THE INVENTION

The present invention provides compositions and processes for reducing the concentration of selenium in water, as defined in this description and the accompanying claims.

Briefly, the present invention features an adsorbent that can adsorb selenate anions in water fast and efficiently compared to other commonly used adsorbents. The subject adsorbent is kaolinite that is commercially available and inexpensive. This invention may lead to a new way to mitigate Se issue in different wastewater treatments.

Other preferred aspects, including preferred conditions and equipment and their advantages, are set out in the description which follows.

BRIEF DESCRIPTION OF THE DRAWINGS

The invention will be better understood and its advantages will become more apparent when the following detailed description is read in conjunction with the accompanying drawings, in which.

DETAILED DESCRIPTION OF THE INVENTION

Figure 1:
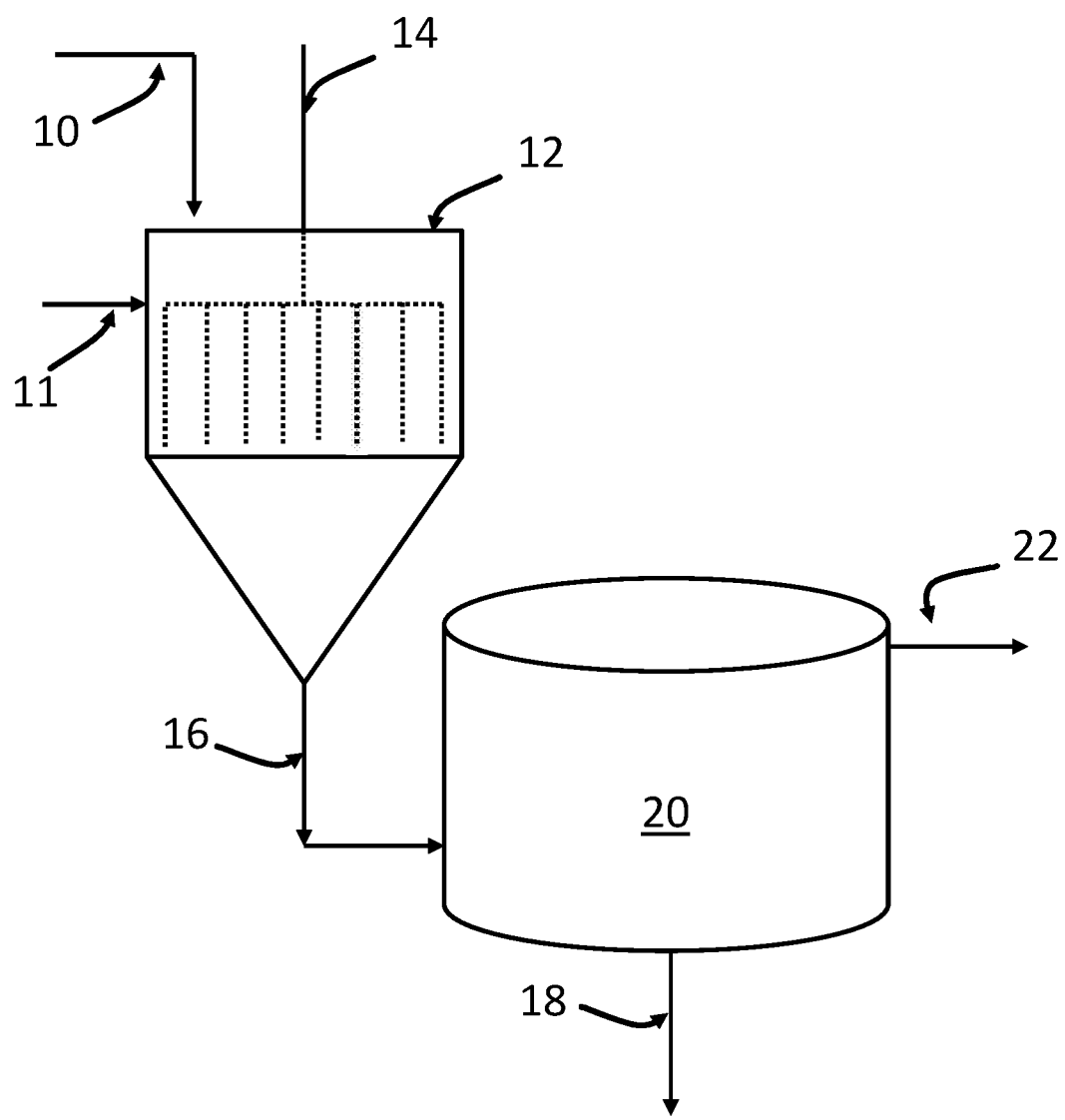
FIG. 1 is a schematic diagram of one embodiment of the invention.

Clay minerals, also known as hydrous Layer silicates, are part of a larger family of minerals called phyllosilicates or Layer silicates. A unit Layer of a given clay mineral is typically composed of a two-dimensional arrangement of tetrahedral and octahedral sheets, each with specific elemental composition. Both tetrahedral and octahedral sheets can have cationic substitutions resulting in a net negative charge which is balanced by interlayer cations. The type of sheets in a unit Layer, degree of substitutions, and stacking of layers vary greatly, and determine the type and economic usefulness of a given clay mineral. Clay minerals can be broadly classified into 2:1 and 1:1 type on the basis of type of sheets in a unit Layer.

The 1:1 type clay minerals, such as kaolinite, are composed of one Si-tetrahedral sheet and one Al-octahedral sheet. Unlike 2:1 type minerals such as bentonite or montmorillonite, the constituent sheets of all 1:1 type clays have practically no cationic substitutions. As a result, 1:1 layers are electrically neutral and lack cation exchange and swelling properties which are the center piece of montmorillonites.

Although kaolinite is not known for its applications as an adsorbent due to its neutral interlayer charge, its 1:1 structure does have the advantage of having a polar interlayer region due to 1:1 sheet configuration. In other words, one side of the interlayer space is lined with oxygens, while the other side is lined by hydroxyls. This polar nature of the interlayer region can potentially attract a variety of organic and inorganic compounds into the interlayer.

In the present invention, kaolinite shows high adsorption efficiency for selenate anions in water at ambient temperature and a wide pH range. The selenate adsorption process is also fast.

More particularly according to the present invention, the percentage of the kaolinite is expressed on the basis of a non-calcined clay, i.e., the clay has not been through a calcination process at a high temperature such as 1,000° C. for several hours. The kaolinite clays are all in fine powder form (e.g., >90% of the particles are less than 2 micron) and contains low moisture content (e.g., <2%).

Adsorption is a process in which pollutants (adsorbate) are concentrated on a solid surface (adsorbent) from its liquid or gaseous surroundings. A good adsorbent should have a strong affinity for targeting adsorbates and can bind them irreversibly under ambient conditions. The most important properties of adsorbents are its removal efficiency (RE), which measures how much % of adsorbate (selenate anion, in this invention) can be removed by a unit weight of adsorbent at a certain experimental conditions (ambient temperature, in this invention).

Several technical parameters of adsorbents are important for adsorption applications. These are surface area that measures the total area available for adsorption per unit weight of the adsorbent measured by a standard method; pore size distribution that measures specific sizes of pores of the adsorbent by a standard method; and surface chemistry such as surface acidity that measures specific chemical functional groups of the adsorbents. The surface acidity can be measured by pH of the slurry containing certain wt % of the adsorbent. Other types of surface chemistry are difficult to measure and usually there is no well-recognized standard method available.

For clay materials, another important parameter is the cation-exchange capacity (CEC). CEC is defined as the amount of positive charge that can be exchanged per mass of material, usually measured in $cmol_c/kg$. Some texts use the older, equivalent units meq/100 g. Clays consist of layered sheets of aluminum and silicon oxides. The replacement of aluminum or silicon atoms by other elements with lower charge (e.g. $Al^{3+}$ replaced by $Mg^{2+}$) can give the clay structure a net negative charge. Some clays such as smectite (including bentonite, hectorite) has high CECs (typical in 100 meq/100 g range). For kaolinite clay, however, the CEC is low (<10 meq/100 g) due to its structure.

The parameters of the adsorbent of the invention (surface area, pore size distribution, surface acidity, and CEC) were measured and compared. Among these four parameters, surface acidity appears to be the most important parameter for selenate adsorption from water. The preferred kaolinite adsorbent has surface acidity lower than 6, and preferred to be less than 5.5, more preferred to be less than 5.

Next, the method for treating selenate-containing water of the present invention is explained.

In the method for treating selenate-containing water of the present invention, the aforementioned adsorbent of the present invention is brought into contact with selenate-containing water so that the selenate in the water is adsorbed by the adsorbent and thereby removed from the selenate-containing water.

There are no particular limits on the selenate-containing water to which this treatment method can be applied. The examples can be from various sources such as coal-fired power plant wastewater, the mining industry wastewater, or natural underground water.

The method of bring the adsorbent of the present invention into contact with selenate-containing water is not particularly limited. For example, the adsorbent of the present invention can be packed into a treatment tank similar to conventional activated carbon adsorption tanks used to treat water or wastewater. In this case, the treatment conditions including the packed amount of adsorbent, the flow volume, and the treatment temperature can be determined based on the adsorbent ability and the amount of selenate of the water or wastewater. The flow of water or wastewater can be either downward or upward. For typical activated carbon adsorbents, a downward flow is preferred because it facilitates recovery of the adsorbent by reversed washing (upward flow). For kaolinite adsorbent, however, recovery may not be necessary due to its low cost compared to commercial activated carbon. Therefore, more flexible engineering designs of the adsorption tanks are applicable for this adsorbent.

Another type of applying the adsorbent of this invention is the batch method. Based on the selenate concentration and the amount of water in the batch, certain amount of the adsorbent of this invention is added into the batch under mixing condition. After a certain time when the adsorption is complete, the slurry is discharged to a settling tank and the used adsorbent is filtered through a filtration system.

FIG. 1 is a schematic diagram of the batch system. The invention can be carried out in a manner illustrated in FIG. 1, wherein an inlet 10 for water to be treated, and an inlet 11 for sorbent replenishment. The water to be treated and filled into reaction tank 12, will contain water-soluble selenium (Se) compounds including, but not limited to, selenite [$SeO_2^{2-}$] and selenate [$SeO_3^{2-}$]. Selenite is usually formed water-insoluble salts such as calcium selenite and can be filtered out from the water. Selenate salts such as calcium selenate, however, is water-soluble and the adsorbent is needed to adsorb the selenate on the surfaces of the adsorbent in order to remove it. The reaction tank 12 is preferably stirred, such as by rotary rake 14 for a residence time in the tank of from about 1 to about 24 hours. The residence time will be selected by a determination of the degree of heavy metal reduction desired and the relative freshness of the acid treated bentonite sorbent. Again, the useful life will be determined by the degree of heavy metal reduction desired as well as the concentration of the heavy metal. Following a sufficient reaction time in reaction tank 12, the mixture of water and sorbent is drained via line 16 to a settling tank 20, from which purified water is extracted via line 22 and sorbent is removed via line 18 for treatment or disposal.

In a broad sense, the compositions of the invention will comprise: 1) a kaolinite clay; or a clay belong to the kaolinite group such as nacrite, halloysite, dickite, and odinite; 2) the preferred kaolinite clay has high surface acidity so that the pH of its slurry in water (1 wt %) is less than 6, and more preferably, less than 5.5, and even more preferably, less than 5. The kaolinite can adsorb selenate anions from water fast and effectively.

Also, in a broad sense, the process will comprise: contacting a selenate-contaminated water with a kaolinite powder at either a continuous adsorption tank system or a batch system with filtration system. For treating a volume of selenate-contaminated water, the sorbent dosage to the volume of the contaminated water is typically in the range from about 1 to about 20, preferably 5 to about 15, more preferably from about 7.5 to about 12.5 g/liter of contaminated water.

The following examples are presented to further explain and illustrate the invention and are not to be taken as limiting in any regard. Unless otherwise indicated, all parts and percentages are by weight.

Example 1

This example compares several commercial forms of kaolinite for their effectiveness in removing selenate from water with other types of solid adsorbents for selenate removal.

Table 1, below, summarizes the results of soluble selenate adsorption [$SeO_4^{2-}$] on different solid adsorbents commonly used at the same test conditions (e.g., 0.5 g of adsorbent added in 50 ml of 1 ppm selenate solution for 30 min adsorption time at room temperature). In the table, A, B and C denote the same type of adsorbent but from either different suppliers or different products of the same supplier. Kaolinite A and B show very good selenate adsorption rates than the others except the activated carbon. Activated carbon is known to be an excellent sorbent for wide varieties of chemicals in water and has been used for water purification commercially for a long time.

TABLE 1

Screening Results of Selenate Adsorption on Different Solid Adsorbents in Water

| Absorbent | Residual Se (VI) Content | Se (VI) Adsorption Rate wt % | pH After Adsorption |
| --- | --- | --- | --- |
| Baseline - No Adsorbent | 1.043 | N/A | 7.57 |
| Kaolinite A | 0.562 | 46.12 | 4.90 |
| Kaolinite B | 0.597 | 42.76 | 5.05 |
| Sodium Bentonite A | 1.031 | 1.15 | 10.08 |
| Sodium Bentonite B | 0.904 | 13.33 | 9.82 |
| Sodium Bentonite C | 0.876 | 16.01 | 9.21 |
| Calcium Bentonite | 0.993 | 4.79 | 8.38 |
| Hectorite A | 1.039 | 0.38 | 9.21 |
| Hectorite B | 1.088 | −4.31 | 9.31 |
| Acid Activated Bentonite A | 0.984 | 5.66 | 3.51 |
| Acid Activated Bentonite B | 0.953 | 8.63 | 3.85 |
| Acid Activated Bentonite C | 1.008 | 3.36 | 4.02 |
| Zeolite | 1.038 | 0.48 | 9.16 |
| Activated Carbon | 0.105 | 89.93 | 8.20 |
| Diatomateous Earth | 1.090 | −1.68 | 4.78 |

However, activated carbon is much more expensive than kaolin, and it is not a selective adsorbent which means that many chemicals will compete with its adsorption sites.

Example 2

This example tests the effectiveness of several materials to see whether there are differences among commercially available kaolinite materials for selenate adsorption. We tested several different kaolinite products from a single supplier, one of the largest kaolinite providers in US, at the same experimental conditions (e.g., 0.5 g of absorbent added in 50 ml of 1 ppm selenate solution for 30 min adsorption time at room temperature) and the results were listed in Table 2 below. The results indicate that there are large differences among these samples.

TABLE 2

Screening Results of Selenate Adsorption
on Different Kaolinite Samples in Water

| Absorbent | Se (VI) Adsorption Rate wt % | pH of Adsorbent in Water* |
|---|---|---|
| Kaolinite A | 46.12 | 4.90 |
| Kaolinite B | 42.76 | 5.05 |
| Kaolinite V | 1.53 | 6.67 |
| Kaolinite W | −1.77 | 7.22 |
| Kaolinite Y | 1.96 | 6.78 |
| Kaolinite Z | −1.87 | 6.26 |

*pH values at 0.5 g absorbent in 50 ml DI water before Se(VI)

Kaolinite A and B show much higher selenate adsorption rates than other kaolinite samples and a series of characterization tests were performed on these samples including: surface area (BET Method), particle size distribution (Malvern Particle Sizer) and elemental Composition (X-ray fluorescence (XRF)).

Surprisingly, these tests did not reveal any significant variations between kaolin A and B and the other samples in the above characterization results (the characterization results were not included in this disclosure). One thing we noticed is that the acidity for kaolin A&B is lower than the other kaolin materials (pH of 4.9 to 5.1, see Table 2), seems to indicate that the lower pH of the sorbent in water (high acidity) might be an important factor to explain why kaolinite A&B have higher selenate absorption rates in water. However, acid activated bentonites (A, B and C listed in Table 1) have even lower pH (pH of 3.5 to 4.0) values in water than those of kaolinite A&B but they have very low selenate absorption (only 3-8%, see Table 1). Also, kaolinite X with pH of 5.4 has no selenate adsorption (−0.84%, see Table 2). More pH effect studies were detailed in Example 5 below.

Example 3

Figure 2:
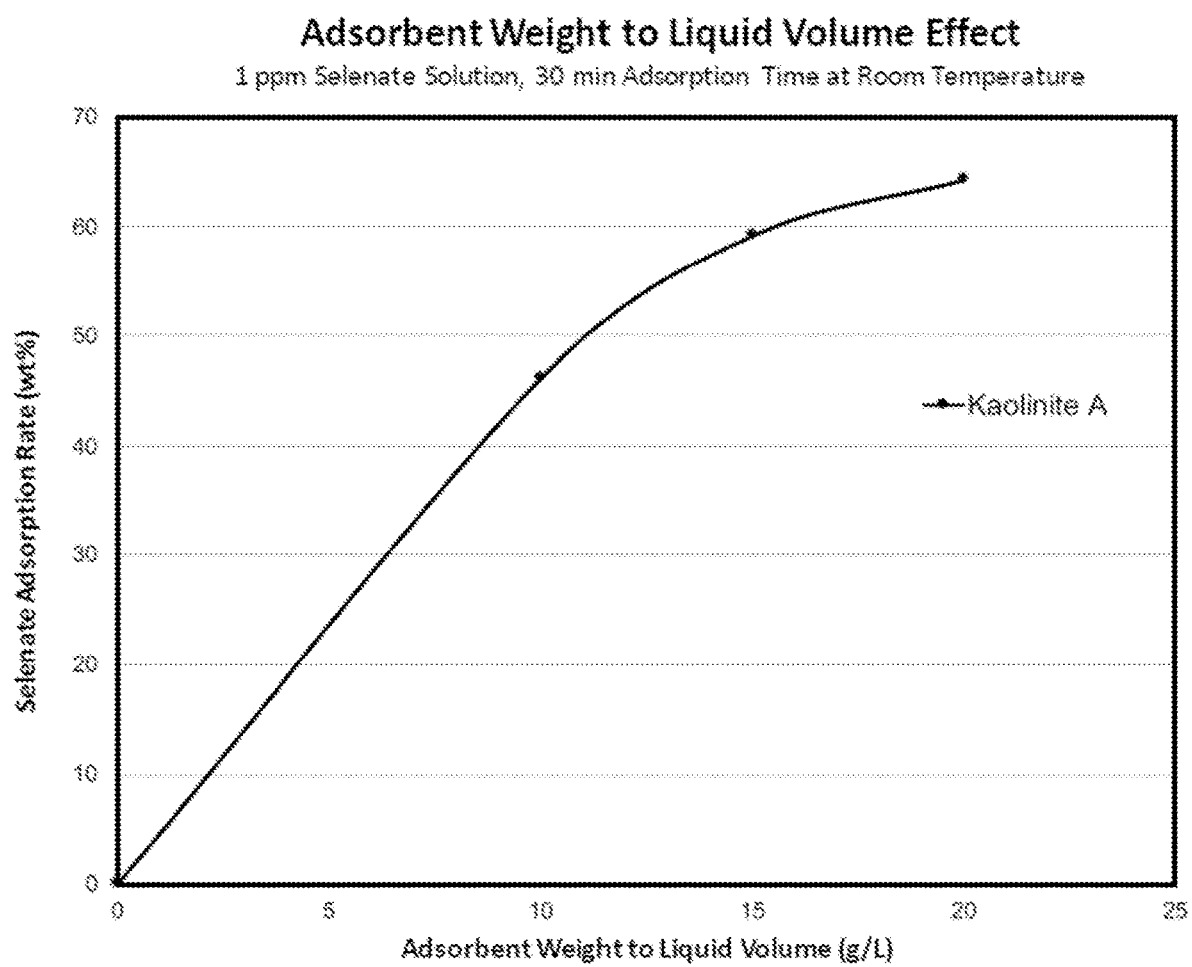
FIG. 2 is a graph of data presented in Example 3 indicating that there is a maximum limit for kaolinite A adsorption of selenate.

This example simply shows that increasing the sorbent dosage while keeping everything else constant (e.g., Selenate concentration and liquid volume) will increase the selenate adsorption rate, as indicated in Table 3 below. The amount of kaolinite A is the only changed factor (e.g., 0.5 g/0.75 g/1.0 g kaolinite A in 50 ml of 1 ppm selenate solution for 30 min at room temperature) and the results show that doubling the dosage of kaolinite A increases about 39% selenate absorption (from 46.12% to 64.24%, see Table 3), indicating that there is a maximum limit for kaolinite A adsorption of selenate (FIG. 2). The maximum rate is about 65% for 1 ppm selenate at the experimental conditions of tests (50 ml liquid volume, etc.)

TABLE 3

Relation between Selenate Adsorption Rate
and Adsorbent Weight to Liquid Volume Ratio

| Kaolinite A/Water Volume (g/L) | Residual Se (VI) Content (µg/g) | Se (VI) Adsorption Rate wt % |
|---|---|---|
| Baseline - No Adsorbent | 1.043 | 0.00 |
| 10 | 0.562 | 46.12 |
| 15 | 0.426 | 59.16 |
| 20 | 0.373 | 64.24 |

Besides the adsorbent dosage effect, another question is whether kaolinite can reduce the selenate below the 0.05 ppm (50 ppb) level to meet EPA selenium allowable level for drinking water. Tables 4A & 4B below show the selenate adsorption rates for kaolinite A and B when the initial Se(VI) concentrations are 0.1 ppm, 0.25 ppm and 1 ppm. When the Se(VI) level is at 0.1 ppm, kaolinite A and B can reduce the Se(VI) levels to below 0.05 ppm (0.05 µg/g).

TABLE 4A

Relation between Initial Selenate Concentration
and Selenate Adsorption Rate on Kaolinite A

| Intial Se(VI)/Kaolinite A (µg/g)* | Residual Se (VI) Content (µg/g) | Se (VI) Adsorption Rate wt % |
|---|---|---|
| 0.095 | 0.039 | 58.95 |
| 0.256 | 0.105 | 58.98 |
| 1.043 | 0.562 | 46.12 |

*Keep concentration constant at 10 g/L only change initial Se(VI) concentration

TABLE 4B

Relation between Initial Selenate Concentration
and Selenate Adsorption Rate on Kaolinite B

| Intial Se(VI)/Kaolinite A (µg/g)* | Residual Se (VI) Content (µg/g) | Se (VI) Adsorption Rate wt % |
|---|---|---|
| 0.095 | 0.041 | 56.84 |
| 0.256 | 0.113 | 55.86 |
| 1.043 | 0.597 | 42.76 |

*Keep concentration constant at 10 g/L only change initial Se(VI) concentration

Example 4

Figure 3:
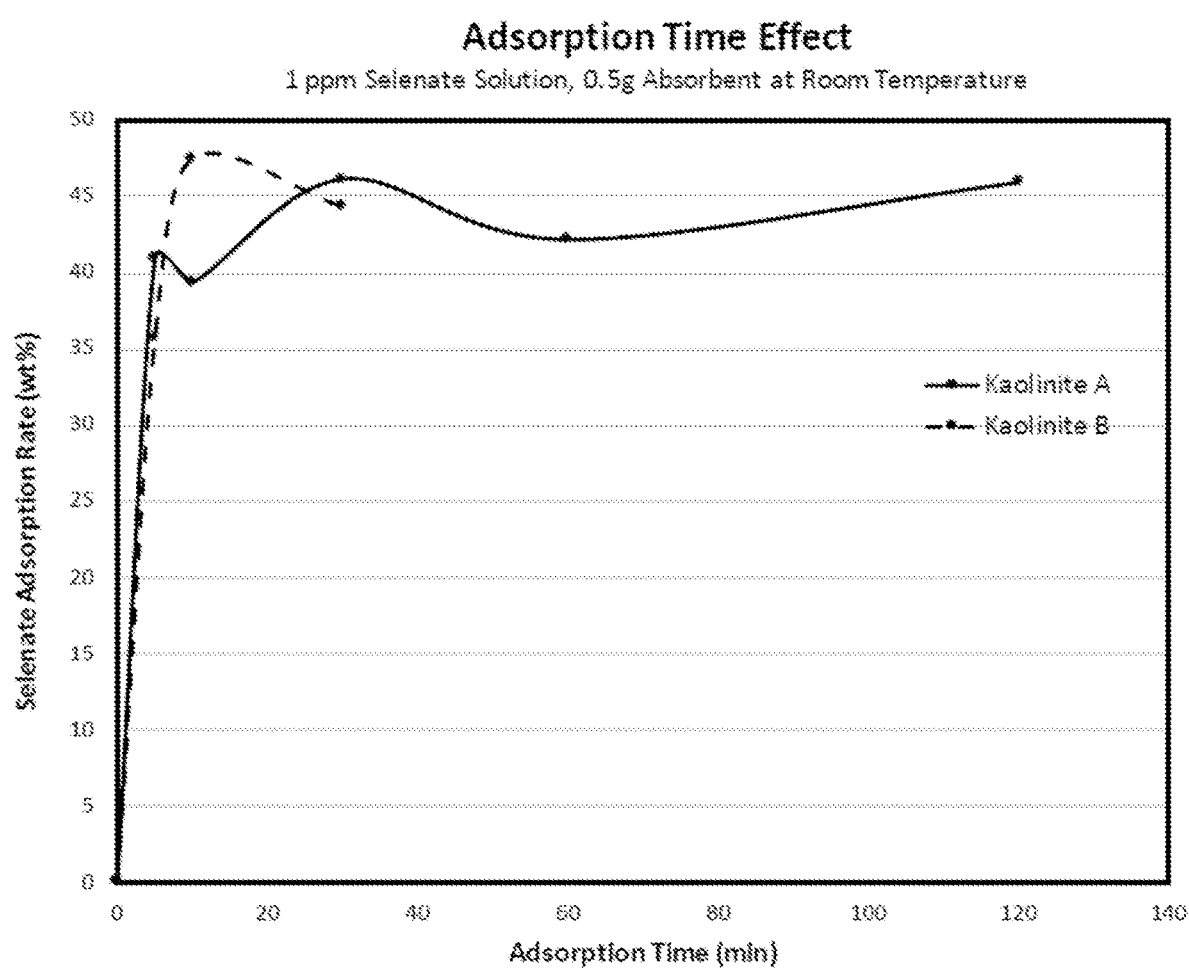
FIG. 3 is a graph of data presented in Example 4 showing that the adsorption rate at 5 min reached about 90% of the maximum adsorption rate.

This example reports results of tests wherein different adsorption times were tested to determine how fast the kaolinite can remove the selenate from water when other parameters are kept constant (e.g., 0.5 g adsorbent in 50 ml of 1 ppm selenate solution at room temperature). The results (Table 5A and 5B and FIG. 3) show that the adsorption rate at 5 min reached about 90% of the maximum adsorption rate. The selenate absorption process by kaolinite is very fast, considering that most adsorption tests usually take times much longer than 5 minutes. It is difficult to test adsorption rate at a shorter time than 5 min due to the experimental procedure.

TABLE 5A

Relation between Selenate Adsorption Rate
and Adsorption Time on Kaolinite A

| Kaolinite A/Shaking Time (min)* | Residual Se (VI) Content (µg/g) | Se (VI) Adsorption Rate wt % |
|---|---|---|
| Baseline - No Adsorbent | 1.072 | 0.00 |
| 5 | 0.633 | 40.95 |
| 10 | 0.650 | 39.37 |
| 30 | 0.562 | 46.12 |
| 60 | 0.620 | 42.16 |
| 120 | 0.580 | 45.90 |

*Keep concentration constant at 10 g/L and only change the shaking time

TABLE 5B

Relation between Selenate Adsorption Rate
and Adsorption Time on Kaolinite B

| Kaolinite A/Shaking Time (min)* | Residual Se (VI) Content (μg/g) | Se (VI) Adsorption Rate wt % |
|---|---|---|
| Baseline - No Adsorbent | 1.072 | 0.00 |
| 5 | 0.689 | 35.73 |
| 10 | 0.563 | 47.48 |
| 30 | 0.597 | 44.31 |

*Keep concentration constant at 10 g/L and only change the shaking time

Example 5

Figure 4:
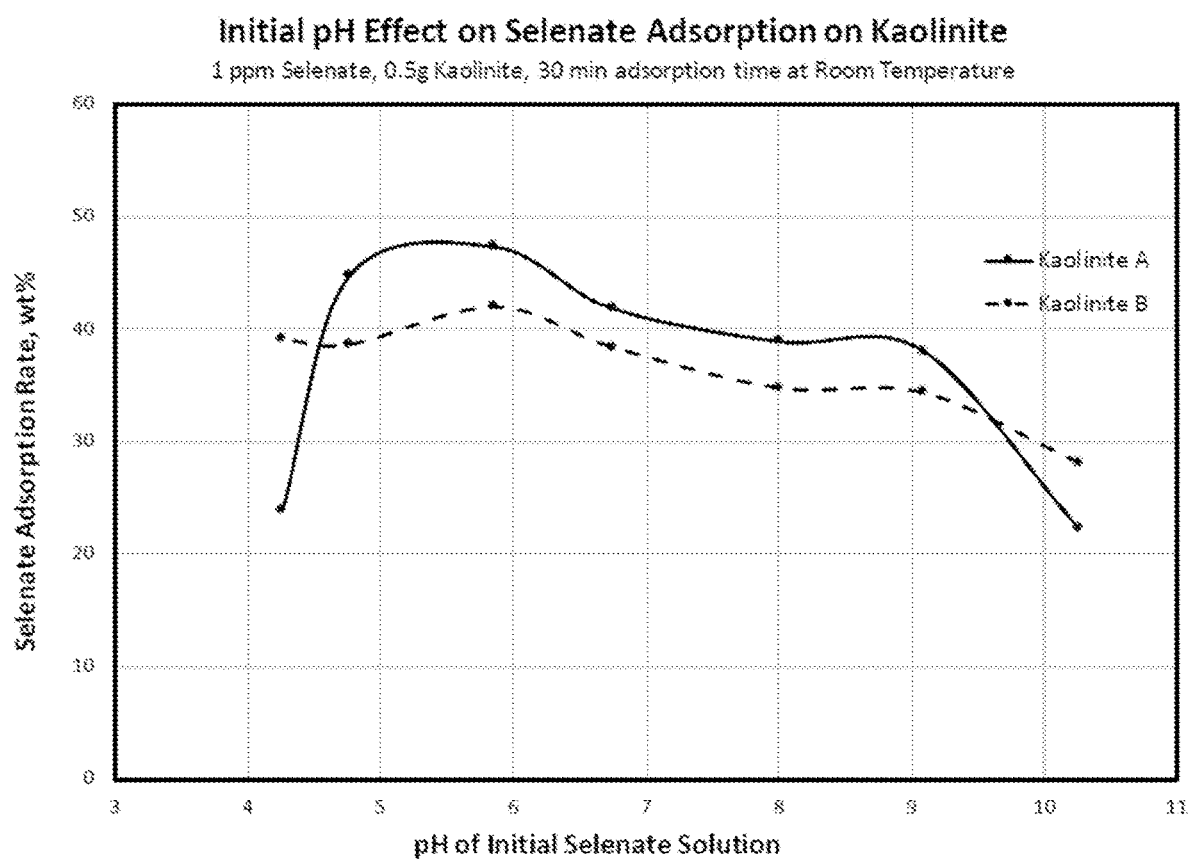
FIG. 4 is a graph of data presented in Example 5 showing that pH is an important factor in aqueous solution and also for the selenate adsorption because pH can affect the surface acidity of the adsorbent and therefore, can affect the adsorption rate.

This example reports results of tests which we conclude shows that pH is an important factor in aqueous solution and also for the selenate adsorption because pH can affect the surface acidity of the adsorbent and therefore, can affect the adsorption rate. The natural pH of the selenate solution in the tests is around 8. We adjusted the pH of the 1 ppm selenate solution from 4 to 10 via 0.1N HCl or 0.1N NaOH solution before added the kaolinite. After the pH adjustment, the kaolin is added to the solution for adsorption tests. The pH of the solution after the adsorption was also measured, together with the adsorption rate. The results were summarized in Table 6A and 6B and FIG. 4.

TABLE 6A

Relation between Initial pH of Selenate Solution
and Selanate Adsorption Rate on Kaolinite A

| pH of Intitial 1 ppm Se(VI) Solution* | Initial Se (VI) Content (μg/g) | pH After Adsorption | Residual Se (VI) Content (μg/g) | Se (VI) Adsorption Rate wt % |
|---|---|---|---|---|
| 10.26 | 1.07 | 7.18 | 0.830 | 22.21 |
| 9.09 | 1.07 | 5.68 | 0.661 | 37.99 |
| 8.00 | 1.02 | 5.10 | 0.625 | 38.85 |
| 6.75 | 1.08 | 5.10 | 0.627 | 41.78 |
| 5.86 | 1.12 | 4.84 | 0.592 | 47.28 |
| 4.77 | 1.03 | 4.64 | 0.567 | 44.74 |
| 4.26 | 1.01 | 4.33 | 0.767 | 23.91 |

*Keep concentration constant at 10 g/L and only change the pH of the 1 ppm Se(VI) solution via 0.1N HCl or 0.1N NaOH

TABLE 6

Relation between Initial pH of Selenate Solution
and Selanate Adsorption Rate on Kaolinite B

| pH of Intitial 1 ppm Se(VI) Solution* | Initial Se (VI) Content (μg/g) | pH After Adsorption | Residual Se (VI) Content (μg/g) | Se (VI) Adsorption Rate wt % |
|---|---|---|---|---|
| 10.26 | 1.07 | 7.73 | 0.767 | 28.12 |
| 9.09 | 1.07 | 6.82 | 0.700 | 34.33 |
| 8.00 | 1.02 | 5.67 | 0.667 | 34.74 |
| 6.75 | 1.08 | 5.69 | 0.664 | 38.35 |
| 5.86 | 1.12 | 5.23 | 0.652 | 41.94 |
| 4.77 | 1.03 | 4.80 | 0.630 | 38.60 |
| 4.26 | 1.01 | 4.43 | 0.614 | 39.09 |

*Keep concentration constant at 10 g/L and only change the pH of the 1 ppm Se(VI) solution via 0.1N HCl or 0.1N NaOH The results indicate that the adsorption rates are relatively stable between pH of 4.5 to 9.0, and pH of 5 to 6 seems to be the optimum range for the kaolinite adsorption of selenate. Kaolin A is more sensitive to low and high pH than kaolin B. Kaolinite samples tested have a natural pH of 4 to 5, which explains the pH drops after adding the kaolin.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A composition for removing selenium from contaminated water comprises:
    a) a kaolinite clay selected from the group consisting of kaolinite, nacrite, halloysite, dickite, and odinite, wherein the kaolinite clay has a surface acidity such that the pH of its slurry in water is less than 6 at 1 weight %;
    b) a water phase with pH in the range of 4 to 9, wherein the kaolinite dosage to the volume of the contaminated water is in the range from about 1 to about 20 g/liter.

2. The composition of claim 1, wherein the clay is kaolinite.

3. The composition of claim 1, wherein the kaolinite clay has a surface acidity such that the pH of its slurry in water is less than 5 at 1 weight %.

4. A composition according to claim 1 in unit dosage form for treating a volume of contaminated water, the kaolinite dosage to the volume of the contaminated water is in the range from about 5 to about 15 g/liter of contaminated water.

5. A method for removing selenium from contaminated water which comprises contacting the contaminated water with:
    a) a kaolinite clay selected from the group consisting of kaolinite, nacrite, halloysite, dickite, and odinite, wherein the kaolinite clay has a surface acidity such that the pH of its slurry in water is less than 6 at 1 weight %;
    b) a water phase with pH in the range of 4 to 9, wherein the kaolinite dosage to the volume of the contaminated water is in the range from about 1 to about 20 g/liter.

6. The method of claim 5, wherein the clay is kaolinite.

7. The method of claim 5, wherein the kaolinite clay has a surface acidity such that the pH of its slurry in water is less than 5 at 1 weight %.

8. A method according to claim 5 in unit dosage form for treating a volume of contaminated water, the kaolinite dosage to the volume of the contaminated water is in the range from about 5 to about 15 g/liter of contaminated water.

* * * * *